United States Patent [19]

Meyer et al.

[11] Patent Number: 5,251,261

[45] Date of Patent: Oct. 5, 1993

[54] DEVICE FOR THE DIGITAL RECORDING AND REPRODUCTION OF SPEECH SIGNALS

[75] Inventors: Peter Meyer, Fürth; Rudolf Hofmann, Forchheim, both of Fed. Rep. of Germany

[73] Assignee: U.S. Philips Corporation, New York, N.Y.

[21] Appl. No.: 623,870

[22] Filed: Dec. 3, 1990

[30] Foreign Application Priority Data

Jun. 15, 1990 [DE] Fed. Rep. of Germany ... 9006717[U]

[51] Int. Cl.⁵ ............................................. G10L 5/00
[52] U.S. Cl. ........................................ 381/36; 381/38; 381/37; 381/40
[58] Field of Search ............................... 381/29–40

[56] References Cited

U.S. PATENT DOCUMENTS

| | | | |
|---|---|---|---|
| 4,698,776 | 10/1987 | Shibata | 381/36 |
| 4,797,925 | 1/1989 | Lin | 381/34 |
| 4,805,217 | 2/1989 | Morihiro et al. | 381/35 |
| 4,811,396 | 3/1989 | Yatsuzuka | 381/30 |
| 4,817,157 | 3/1989 | Gerson | 381/40 |
| 4,896,361 | 1/1990 | Gerson | 381/40 |
| 4,924,508 | 5/1990 | Crepy et al. | 381/49 |
| 4,933,957 | 6/1990 | Bottan et al. | 381/29 |
| 5,060,269 | 10/1991 | Zinser | 381/38 |

OTHER PUBLICATIONS

"Speech Codec for the European Mobile Radio System" IEEE, Proc. ICASSP Sep. 1988, New York by Vary et al. pp. 227–230.

*Primary Examiner*—Dale M. Shaw
*Assistant Examiner*—Kee M. Tung
*Attorney, Agent, or Firm*—Bernard Franzblau

[57] ABSTRACT

Devices for the digital recording and reproduction of speech signals are used, for example in answering apparatus. In order to reduce the quantity of data to be stored without noticeably affecting the acoustic quality of the speech, it is proposed to encode speech signals by means of a residual signal speech encoder.

31 Claims, 2 Drawing Sheets

Fig. 1

| | | | | | | | | | | |
|---|---|---|---|---|---|---|---|---|---|---|
| Fig 2a | |0|0| | STP | |LTP1|LTP2|RPE1|RPE2|RPE3|RPE4| | | | | |
| | |2 bit| | 36 bit | | 20 bit | | 112 bit | | Σ 170 bit |

Fig 2a   |0|0|   STP   |LTP1|LTP2|RPE1|RPE2|RPE3|RPE4|
         |2 bit|  36 bit  |   20 bit   |     112 bit       | Σ 170 bit Fig 2b   |0|1|   STP   |0|0|RPE1|RPE2|RPE3|RPE4|
         |2 bit|  36 bit  |2 bit|     112 bit       | Σ 152 bit Fig 2c   |0|1|   STP   |1|0| LTP2 |RPE1|RPE2|RPE3|RPE4|
         |2 bit|  36 bit  |2 bit| 10 bit |     112 bit       | Σ 162 bit Fig 2d   |0|1|   STP   |0|1| LTP1 |RPE1|RPE2|RPE3|RPE4|
         |2 bit|  36 bit  |2 bit| 10 bit |     112 bit       | Σ 162 bit Fig 2e   |0|1|   STP   |1|1|N1|N2|N3|N4|
         |2 bit|  36 bit  |2 bit|   24 bit   | Σ 64 bit Fig 2f   |1|0|0|0|RPE1|RPE2|RPE3|RPE4|
         |  4 bit  |     112 bit       | Σ 116 bit Fig 2g   |1|0|1|0|LTP2|RPE1|RPE2|RPE3|RPE4|
         |  4 bit  |10 bit|    112 bit     | Σ 126 bit Fig 2h   |1|0|0|1|LTP1|RPE1|RPE2|RPE3|RPE4|
         |  4 bit  |10 bit|    112 bit     | Σ 126 bit Fig 2i   |1|0|1|1|N1|N2|N3|N4|
         |  4 bit  |   24 bit   | Σ 28 bit Fig 2j   |1|1|   STP   |N1|  T  |
         |2 bit|  36 bit  |6 bit| 8 bit | Σ 52 bit

DEVICE FOR THE DIGITAL RECORDING AND REPRODUCTION OF SPEECH SIGNALS

BACKGROUND OF THE INVENTION

This invention relates to a device for the digital recording and reproduction of speech signals.

Devices for the digital recording and reproduction of speech signals are used, for example, in telephone answering apparatus. Answering apparatus utilizing digital speech recording in and reproduction from an electronic memory have the advantage that they can be realized without moving mechanical parts.

For example, from DE-PS 32 32 398 there is known a telephone answering system which comprises a memory in which a text and/or a message from a caller can be stored in delta modulation.

SUMMARY OF THE INVENTION

Among other things, it is an object of the present invention to provide a device of the kind set forth in which the amount of data to be stored is reduced without noticeably affecting the speech quality.

According to one particular aspect, this object is achieved in that for the recording, digitized speech sampling values of the analog speech signal are combined in a respective time frame, for each time frame there being formed a digital overall code word which allows for containing a first code word for the spectral envelope (STP code word), a second code word for the periodicity (LTP code word), and a third code word for a residual signal (RPE code word).

The principle of such a known residual signal speech encoder (for example, see P. Vary, K. Hellwig, R. Hofmann, R. J. Sluyter, C. Galand, M. Rosso: Speech Codec for the European Mobile Radio System, Proc. ICASSP, New York 1988, pp. 227 to 230) consists in the separate analysis and encoding of slowly varying speech quantities. Such quantities are, for example, the spectral envelope, the periodicity and a residual signal which remains after these analyses by inverse filtering. For analysis, a plurality of successive speech sampling values are combined in a time frame, for example, having a duration of 20 ms. From each of these analysis steps paramenters describing the analysis results are derived and encoded as binary data (code words). The respective code words of the individual analysis steps are combined so as to form a single overall code word in a code multiplexer.

During a first analysis step, the spectral, resonance-like properties of a speech sound are analysed and encoded. These encoded parameters control a filter which extracts this spectral information from the speech signal. Because this method is based on the prediction of a current sampling value from a combination of the directly preceding sampling values, this method is referred to as an STP or Short Term Prediction method.

This filtering operation produces a first residual signal which is referred to hereinafter as the STP residual signal. The STP residual signal still contains the line spectrum produced by vibration of the vocal cords. The STP residual signal can be described or encoded by the period duration and the similarity of successive periods. Because during this step current sampling values are estimated from sampling values situated comparatively far back, this method is referred to as a Long Term Prediction or LTP method. The signal components taken into account for the LTP analysis are extracted from the STP residual signal in a further filter.

A second residual signal, which remains after the filtering of the STP residual signal, will be referred to as the LTP residual signal hereinafter. The LTP residual signal is of a predominantly noise-like nature and contains only relatively little information so that it can be coarsely quantized and encoded as regards time as well as resolution. A known possibility for analysing and encoding the LTP residual signal is the representation of the LTP residual signal as a regular pulse sequence. Such an analysis and encoding method is, therefore, referred to as a Regular Pulse Excitation or RPE method.

For the decoding, that is to say for the synthesizing of a speech signal from the data encoded in the described manner, the RPE encoded residual signal is first applied to an LTP synthesis filter which again impresses a periodicity on the signal. Subsequently, the signal is spectrally toned by an STP filter, after which it is available as a speech signal.

Using such a residual signal speech encoding method, the quantity of data to be stored can be reduced to approximately 8.4 kbit/s. As a result, approximately two minutes of speech can be stored in a memory having a storage capacity of 1 MB.

This small quantity of data can be reduced even further when special steps to be described below are taken.

For example, it is advantageous to utilize a symbol (STP parameter repetition symbol) which indicates whether the overall code word contains an STP code word or not, the contents of the symbol being formed in dependence on a comparison between speech sampling values of a first time interval and speech sampling values of a second, already encoded time interval.

In a residual signal speech encoder, for example, new parameters are calculated and encoded for the short term prediction (STP) parameters every 20 ms. However, in some sounds, for example, long vowels, the change in the spectral properties is so small during 20 ms that the parameters of the STP already encoded during the preceding time interval can be used as an STP prediction value. This is indicated by the setting of the STP parameter repetition symbol in the overall code word. When the STP parameter repetition symbol is in the set state, the STP encoding data of the preceding time interval are used for the decoding operation in the decoder.

It has been found that on average in half the cases an STP parameter repetition is possible, without giving rise to audible differences. In a speech encoder/decoder (speech codec) as claimed in claim 1, where each time 36 data bits are provided for the STP parameter for the encoding of a time frame of 260 data bits, on average a reduction of 18 data bits is thus obtained per time frame.

For the standard of comparison use can be very attractively made of the sum of the square distances of the inverse Fourier transform of the log-power density spectrum (cepstrum) of the two time frames to be compared. The cepstrum of a time frame, however, can be simply calculated from the parameters involved in the STP analysis. For calculating the standard of comparison, for example, only the first eight cepstrum coefficients need be used. For the comparison of the two time frames, the cepstra of the two time frames are particularly suitable because they can be compared directly via the square distances. This is not possible for other STP parameters.

When the STP parameter repetition symbol is set, it must be taken into account accordingly for decoding, i.e. for speech synthesis. To this end, the reproduction section of the answering apparatus comprises a memory whose contents are used as the STP code word for speech synthesis. For each new STP code word, i.e. when the STP parameter repetition symbol has not been set, the contents of the memory are replaced by the new STP code word. However, when the STP parameter repetition symbol has been set, no STP code word is included in the newest overall code word and the old memory contents are saved. The memory thus always contains the latest valid STP code word, without it being necessary for an STP code word to be present in each overall code word.

A further possibility for reducing the quantity of data is offered by the invention in that in a speech codec as claimed in claim 1, a symbol (LTP suppression symbol) is provided in the overall code word, which symbol indicates whether the overall code word contains an LTP code word or not, the contents of the symbol being formed in dependence on a comparison of the signals before and after the LTP analysis.

During speech synthesis the LTP code word is extracted from the overall code word if the LTP suppression symbol has not been set, said LTP code word being used for speech synthesis in the customary manner. However, when the LTP suppression symbol has been set, the overall code word does not contain an LTP code word. For speech synthesis the LTP synthesis filter is then bypassed or, as an equivalent possibility, the parameters of the LTP synthesis filter are adjusted so that the signal traversing the LTP filter is not modified.

The LTP suppression symbol is set whenever the LTP cannot recognize any periodicity as it occurs, notably at the beginning of the vowels and sibilants. It has been found that the omission of the LTP parameters does not cause any audible losses in the reproduced synthesized speech signal in these cases. In a speech codec as claimed in claim 1 in which, for example, four 9-bits sets of LTP parameters are generated per time interval, nine, eighteen, twenty-seven or thirty-six bits can thus be saved, depending on the contents of the speech signal.

In order to decide whether or not the LTP parameters can be omitted, the ratio of energy contents of the LTP residual signal and of the STP residual signal is formed and compared with a threshold value. For ratios exceeding said threshold value, the LTP suppression symbol is set. For example, the number 0.8 has been found to be a suitable threshold value.

A further possibility for reducing the data rate can be achieved in accordance with the invention by forming, in the case of a recognized pause, an overall code word from code words which describe the length (T), the energy content (N1) of the noise in the pause, and the spectral properties (STP code word) of this noise.

Approximately 20% of speech consists of pauses. These pauses occur everywhere between the sentences, the words and even within the words. In the case of recognized pauses, therefore, only the few parameters required for describing a pause are transmitted. The average data rate can thus be reduced further.

Notably the length of a pause is particularly suitable to describe a pause, so that for pauses which last several time intervals encoding will be required only at th beginning of the pause.

However, during a pause it is either silent or background noise is heard. The silence can be recognized on the basis of the low power and the background noise can be recognized, using suitable algorithms, on the basis of its constant spectral properties. The noise present during a pause does not offer further information to the listner of the speech output of the decoder, but prevents annoyance to the listener when complete silence exists during a speech pause since a background noise usually is audible during the reception of speech data. Thus, even the pauses appear to be natural to the person listening. In order to achieve this effect of naturalism, however, it is already sufficient to imitate roughly at the decoder side the properties of the noise occuring at the encoder side.

Because silence or noise contains very little information, it can be encoded with very low bit rates. The overall code word, therefore, will be formed not only by a code word which indicates the length of a pause, but also by a further code word which describes the energy content of the noise during a pause and another code word which describes the spectral properties of the noise during a pause. Even though a pause may last for several time frames, only the data of a single time frame are used to describe the noise. Regardless of the length of a pause, only a few bits are required for encoding that pause.

For speech synthesis a code word is extracted from the overall code word in the case of a pause symbol set in the overall code word, which extracted code word is applied to a timer and extracts further remaining code words which are applied to a noise generator. The code word applied to the timer describes the length of the pause. During the pause, the synthesized speech signal is formed exclusively from the noise signal generated by the noise generator. The timer imparts a duration to the noise which corresponds to the encoded length of the pause. After termination of the pause, the speech decoder is switched back to the normal mode again and the speech signal is composed of the STP, LTP and RPE code words or parts thereof.

The mean bit rate can also be reduced by providing a symbol (unvoiced symbol) in the overall code word, which symbol indicates whether the overall code word consists either only of an STP code word or also of other code words, the contents of the symbol being formed in dependence on a voiced/unvoiced decision.

For speech analysis, the device the LTP synthesis is bridged in dependence on a symbol contained in the overall code word. Instead of generating a residual signal, a noise signal is generated by the device for generating a residual signal. To this end, use is made of code words which are contained in the overall code word and which describe the noise energies during individual time frames. The STP code word ultimately still present in the overall code word is applied to an STP synthesis filter and tones the generated noise signal in accordance with the spectral properties of the STP synthesis filter adjusted by way of the STP code word.

Approximately 20% to 30% of (German) speech consists of unvoiced sounds, sibilants such as s, f or sch. These sounds can advantageously be described simply as toned noise. The STP parameters contained in the STP code word and parts of the RPE parameters offer an adequate description in this respect. In the speech codec claimed in claim 1, only 54 bits of, for example, a total of 260 bits per time frame are thus required.

Assuming a bit rate of 8.4 kbit/s for a speech codec as claimed in claim 1, a combination of the described further solutions can lead to an average data rate of 5 kbit/s. This corresponds to a reduction of the data rate by approximately 40%. In the case of a mean bit rate of 5 kbit/s, approximately 3.5 minutes of speech can be stored in an M-bit RAM or approximately 5 minutes in a 1.5 M-bit RAM. Five minutes of speech suffice for the storage of approximately 10 calls.

Further advantages of the digital storage described consist in that, using a suitable control device, individual calls can be erased or transferred to another data carrier. Contrary to mechanical answering apparatus, moreover, substantially no delay occurs in the random access to arbitrary calls.

BRIEF DESCRIPTION OF THE DRAWINGS

The invention will be described in detail hereinafter with reference to the accompanying drawing, wherein.

DESCRIPTION OF A PREFERRED EMBODIMENT

Figure 1:
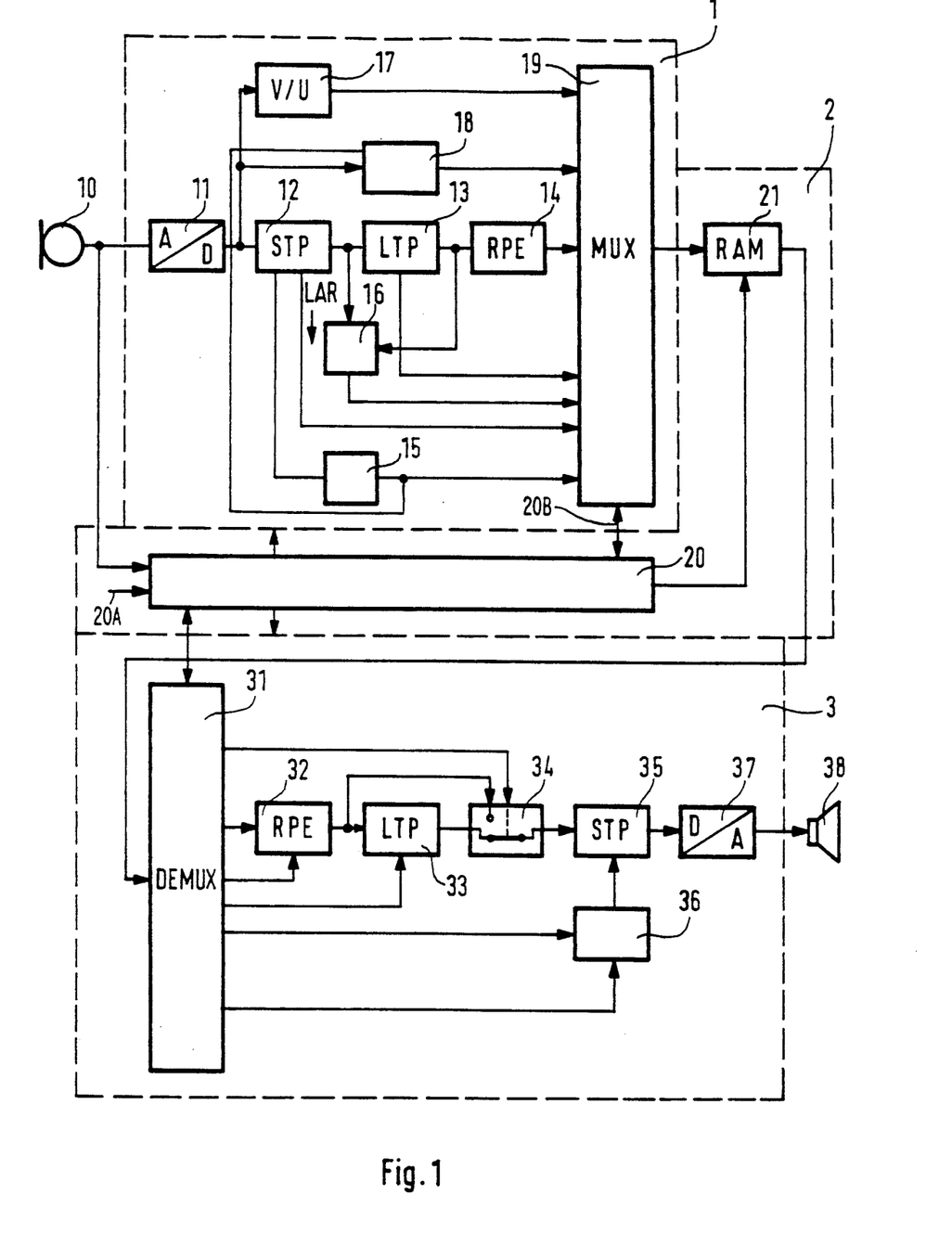
FIG. 1 shows an answering apparatus comprising a residual signal speech encoder/decoder.

FIG. 1 diagrammatically shows an answering apparatus which comprises a speech encoder 1, a device for storing encoded speech signals 2, and a residual signal decoder 3 for reproducing the stored speech signals (speech synthesizer). A control circuit 20 controls the caller-specific functions such as the recording of the speech signals of a caller and the reproduction of the stored speech signals. For brevity, this control circuit has not been further specified inasmuch as it does not relate to the invention proper.

The answering apparatus can be connected to a telephone set via input socket 10. The answering apparatus may constitute a self-contained unit or be integrated in a telephone set. The control circuit 20 is also connected to the telephone set via input socket 10 or by means of a separate connection 20A in order to detect the various operating states of the telephone set and to take into account the modes of operation commanded by a user, for example, by the depression of keys (readiness for recording, reproduction). The construction of such a control circuit 20 will be evident to those skilled in the art and does not from a part of the present invention. Therefore, the control circuit will not be elaborated upon in as far as it controls the procedures preceding the actual recording in an answering apparatus (for example, in response to an incoming call first an announcement is issued).

During the "recording", the telephone signal present on the input socket 10 is sampled at a frequency of 8 kHz by an analog-to-digital converter 11. The speech sampling values thus obtained are resolved according to 8 bits per speech sampling value. According to this so-called PCM coding system, per second 64 kbits of information to be stored arrive. In order to reduce this quantity of data, the speech sampling values are first prepared in known manner in an RPE (regular pulse excitation) residual signal encoder. The construction of such an RPE residual signal encoder, comprising a short term prediction device (12) for analysis and encoding of so-called short term prediction values (STP), a long term prediction device (13) for analysis and encoding of so-called long term prediction values (LTP), and a regular pulse excitation coding device (14) for analysis and encoding of the regular pulse excitation values (RPE), is known to those skilled in the art and is disclosed, for example, in the cited publication. Therefore, the internal construction of these devices will not be elaborated hereinafter. The code words generated by these devices, however, will first be described.

Recurrently, 160 consecutive speech sampling values are combined in a time frame. In accordance with the sampling rate of 8 kHz, the duration of a time frame is 20 ms. During the STP analysis/encoding, so-called LAR coefficients (Logarithmic Area Ratios) are generated to describe the spectral envelope of each time frame. In the present embodiment there are exactly 36 bits for the encoding of these LAR coefficients.

For the long term prediction the time frame is cut in half, thus forming two sub frames which are referred to as half-frames hereinafter and which comprise 80 speech sampling values each. For each half-frame there are 10 bits for describing the periodicity.

The LTP residual signal remaining after the LTP analysis is analysed again in inverted blocks of each time 40 coherent speech sampling values during the RPE-analysis/encoding. Because it corresponds exactly to one quarter of a complete time frame, such a block is referred to hereinafter as a quarter-frame. For each sub-block of 40 speech sampling values there are 28 bits for encoding, so that 112 bits in total are required for the encoding of a complete time interval. The first 6 bits of a respective RPE code word described the maximum amplitude of the LTP residual signal.

The code words resulting from the separate analysis are applied to a code multiplexer 19 (overall code word forming means) which combines the individual code words so as to form an overall code word. If only these code words were utilized for forming the overall code word, each overall code word would have a length of exactly 168 bits.

For 50 time frames per second, this corresponds to a data rate of 8.4 kbit/s. This data rate is slightly lower than the data rate of the speech encoder described in the cited reference.

For the further data reduction described hereinafter, the requirements are equally severe because even the slightest deterioration of the speech quality must be avoided.

For a further reduction of the data rate, the speech encoder 1 comprises an STP comparison device 15, an LTP decision device 16, a voiced/unvoiced decision device 17, and a pause detector 18, each of said devices generating its own control signals. These control signals are applied, like the code words from the individual analysers/encoders 12, 13, 14, to the code multiplexer 19 which provides an overall code word of variable length from all of said information for each time frame.

In the STP comparison device 15, therefore, the cepstrum of each time frame is calculated from the data resulting from the STP encoding. The cepstra of two successive time frames are compared in that the quadratic distance of the two cepstra is calculated. The quadratic distance each time calculated is compared with a presettable threshold value. From this comparison there is derived an STP parameter repetition signal which indicates whether the quadratic distance of the two cepstra is larger or smaller than the presettable threshold value. This STP parameter repetition signal is applied from device 15 to the code multiplexer 19.

The LTP decision device 16 receives the output signal of the STP analysis (the STP residual signal) as well as the output signal resulting from the LTP analysis (LTP residual signal). In the LTP decision device 16 the energy content of these two residual signals are separately calculated for each half-frame. For each half-frame the energy content of the LTP residual signal is scaled to the energy content of the STP residual signal and compared with a presettable threshold value, preferably the value 0.8, for each sub-frame separately. Depending on whether the threshold value is exceeded or not, the LTP suppression signal is generated, possibly separately, for each half-frame, which signal is also applied to the code multiplexer 19.

In the voiced/unvoiced decision device 17 a decision is made as to whether a voiced or an unvoiced sound is to be a associated with the speech sampling values of a time frame. The construction of such a voiced/unvoiced decision is well known to those skilled in the art. In the present embodiment, the voiced/unvoiced decision device 17 determines the energy content of the low-pass filtered speech sampling values, the zero-crossing density of the speech signal, the spectral properties of the speech signal s described by so-called reflection coefficients (Parcor coefficients), and the above ratio of STP residual signal energy versus LTP residual signal energy. On the basis of predetermined decision criteria, an appropriate decision is made and an "unvoiced" signal may selectively be generated and applied to the code multiplexer.

The STP parameter repetition signal generated by the STP comparison device is applied to the pause detector 18 for the recognition of pauses. The pause detector comprises a counter which counts the number of successive STP parameter repetition symbols. For each such symbols, the abovementioned parameters with reference to the voiced/unvoiced detector are stored. If no STP parameter repetition symbol is generated, the counter is reset to zero and the abovementioned parameters in the memory are erased. However, if the counter counts more than 20 such symbols, this signal present in the preceding interval is considered as being background noise only. From the parameters then stored a comparison sample is formed. which sample cna be compared with future parameter values therefter. As in the case of the voiced/unvoiced decision, a speech/background decision of pause detection can thus realised.

When used for an answering apparatus, such adaptation to background can take place at the beginning during the announcement by the answering apparatus, because the caller does not speak at that instant and the background noise is still audible.

When a pause is recognized, a control signal is generated which is referred to as the pause control signal hereinafter. This pause control signal is also applied to the code multiplexer 19.

On the basis of the different control signals formed for each time frame, the code multiplexer forms overall code words of various compositions. This composition for the various cases will be described hereinafter.

Figure 2A:
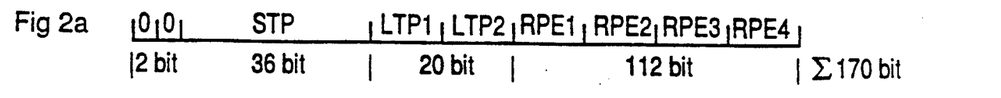
FIGS. 2a-2j show the overall code words generated by a code multiplexer.

FIG. 2a shows an overall code word format as it is composed for the complete transmission of a maximum-length code word. A complete transmission of a code word is necessary when the speech sampling values of a time frame are voiced, when a parameter repetition is not possible and when relevant code words are also supplied by the LTP analysis. In this situation, the value zero is assigned to each of the first two bits of the overall code word. This is followed in the next 36 bits by the STP code word extracted during the STP analysis, followed each time by 10 bits for either LTP code word LTP1, LTP2 of the first and the second quarter-frame respectively, and subsequently 28 bits for the RPE parameters RPE1, RPE2, RPE3, RPE4 of the first, the second, the third and the fourth RPE quarter-interval, respectively. A complete overall code word thus composed consists of 170 binary positions in total.

Figure 2B:
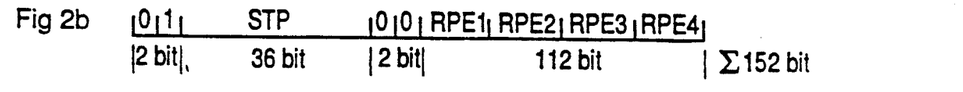
Figure 2C:
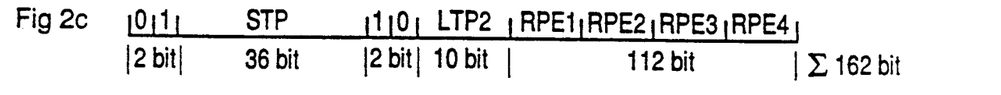
Figure 2D:
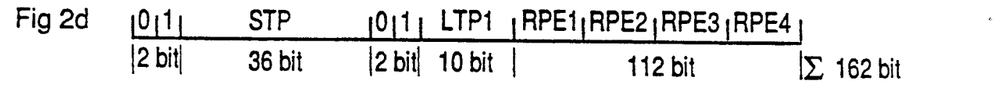

In the case of an active LTP suppression signal and a non-active STP parameter repetition signal, the first bit of the overall code word has the binary value zero and the second bit of the overall code word has the binary value one. These two symbol bits are followed by the STP code word with an overall length of 36 bits. The next two bits serve to indicate whether only one of the two LTP code words or both LTP code words are suppressed. When both LTP code words are suppressed, these LTP symbols both have the binary value zero and are followed by the four code words for RPE encoding (see FIG. 2b). However, if only the first LTP parameter set is suppressed, the first LTP symbol bit has the binary value one and the second LTP symbol bit has the binary value zero. The two symbol bits are then followed by the 10-bit second LTP code word LTP2 which itself is followed by the four 28-bit RPE code words (see FIG. 2c). However, if the second LTP code word is to be suppressed, the two LTP symbol bits have the binary values one and zero. The LTP symbol bit is followed by the 10 bits of the first LTP parameter set (see FIG. 2d), and subsequently by the four 28-bit RPE code words.

Figure 2E:
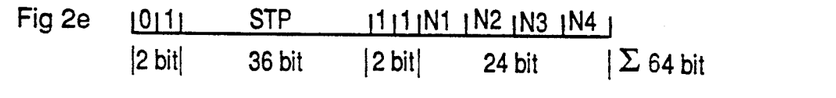

As soon as the unvoiced control signal is active, both LTP code words are suppressed, regardless of the LTP suppression signal. For the characterization of this state, the binary value 1 is assigned to both LTP symbol bits (see FIG. 2e). The two set LTP symbol bits are followed, separately for each quarter time interval, by four code words N1, N2, N3, N4 which indicate the energy content of the relevant quarter-frame. Each of these code words that specify the energy content has a length of 6 bits and corresponds to a given part of an RPE code word. Using the STP code word contained in the overall code word, the spectral properties of the noise are described. An overall code word thus formed has an overall length of only 64 bits.

Figure 2F:
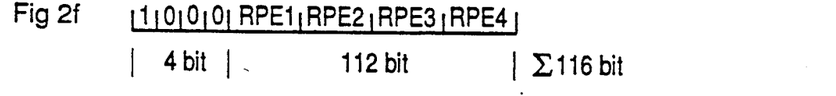
Figure 2G:
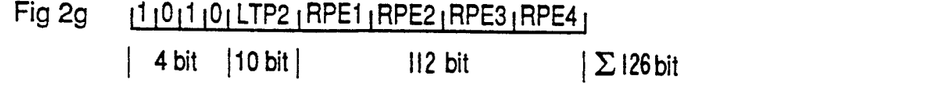
Figure 2H:
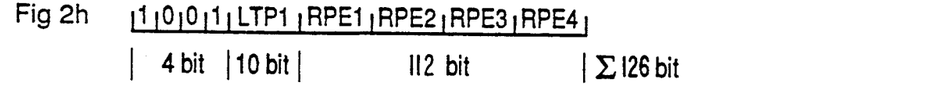

The overall code words shown in the FIGS. 2f to 2h are formed in the presence of a voiced time frame for which an STP parameter repetition applies. In that case the first bit of the overall code word has the binary value one and the second bit has the binary value zero. Because this indicates the absence of an STP code word in the overall code word, the next bits are already the symbol bits for LTP code word suppression. When both LTP code words can be suppressed, these next two bits each have the binary value zero and are followed by the four code words for RPE encoding (see FIG. 2f).

However, if only the first LTP code word can be suppressed, the third bit has the binary value one and the fourth bit has the binary value zero. These bits are then succeeded by the second LTP code word LTP2, followed by the four RPE code words (see FIG. 2g). When the second LTP code word is suppressed, the third bit has the binary value zero and the fourth bit has the binary value one. Contrary to the foregoing example, instead of the second LTP code word LTP2 the first LTP code word LTP1 is then inserted in the corresponding position in the overall code word (see FIG. 2h).

Figure 2I:
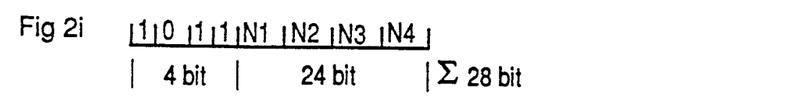

In the case of the simulataneous occurence of an STP parameter repetition and an unvoiced time frame, the code multiplexer 19 forms an overall code word whose first, third and fourth bit each have the binary value one and whose second bit has the binary value zero (see FIG. 2i). These four symbol bits are then followed, for each of the four quarter-frames, exclusively by their respective energy contents N1, N2, N3, N4. Thus, an overall code word is obtained having a length of only 28 bits.

Figure 2J:
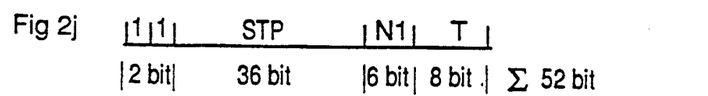

As soon as the pause signal is active, independently of the other control signals, an overall code word is generated whose first two bits have the binary value one (see FIG. 2j). In the subsequent 36 bits the STP parameters for characterizing the spectral envelope are inserted. Subsequently, there are 6 bits for describing the energy of the noise, for which purpose use is made of the energy coefficient N1 of the first RPE code word. The last 8 bits of the overall code word thus formed indicate the duration T of the pause as a number of time frames. Using 8 bits, pauses of up to 5.12 seconds can thus be encoded in the present embodiment. This is usually adequate. In the case of long pauses, however, a second or third overall code word can be used for describing the pause. A pause having a length of up to 5.12 seconds can thus be encoded using only 52 bits.

The overall code words formed by the code multiplexer 19 are successively stored in a storage means such as random access memory 21. The write and read operations in this memory are also controlled by the control device 20. In order to take into account the variable lengths of the overall code words, the control device 20 is also connected to the overall code multiplexer 19 via appropriate signaling and control leads 20B.

For synthesis of a speech signal from the stored overall code words, these words are applied to a demultiplexer 31 of the speech synthesizing means 3. Depending on the generated symbols, the demultiplexer 31 extracts, in as far as present in the overall code word, the four RPE code words RPE1, RPE2, RPE3, RPE4, up to two LTP code words LTP1, LTP2, one STP code word STP, as well as various control signals. The RPE code words are applied to a device 32 for RPE synthesis. From the code words in each quarter-frame the device 32 for RPE synthesis generates an excitation signal or, if instead of the RPE code word the overall code word contains only code words N1, N2, N3, N4 for the noise power in accordance with the set symbols, a noise signal which corresponds to the relevant noise power.

The excitation signal thus formed is applied to a device 33 for LTP synthesis. During LTP synthesis, appropriate periodicity is added to the RPE excitation signal by means of the LTP code words, if any, present in the overall code word and applied to this device. Using a switch 34 (symbolically shown), the device 33 for LTP synthesis can be bridged so that optionally the output signal of the device for LTP synthesis or the original RPE excitation signal can be applied to a device 35 for STP synthesis. The switching-over between these two signals takes place in dependence on the unvoiced symbol present in the overall code word.

Whenever the overall code word contains an STP code word, this word is stored in a buffer memory 36. The writing of this STP code word results from a signal extracted from the STP parameter repetition symbol contained in the overall code word. This signal is also applied to the buffer memory 36 and controls the buffer memory 36 so that in the buffer memory 36 each time the last STP code word extracted by the demultiplexer 31 is buffered until a new STP code word can be extracted from the relevant overall code word. The STP code word buffered in the buffer memory 36, however, is applied to the STP synthesis filter 35 in each time frame. Thus, for as long as no new STP code word is written into the buffer memory, the STP synthesis filter 35 utilizes the same filter coefficients in successive time frames. The output signal of the STP synthesis filter 35 is applied to a digital-to-analog converter 37. The analog signal formed by this conversion is reproduced via a loudspeaker 38, possibly after intermediate amplification.

We claim:

1. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accommodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, and wherein the overall code word contains a STP parameter repetition symbol which indicates whether the overall code word contains an STP code word or not, said process further comprising: forming the STP repetition symbol as a function of a comparison between speech sampling values of a first time frame and speech sampling values of a second, already encoded time frame.

2. A process as claimed in claim 1, further comprising, for the comparison of the speech sampling values, forming a sum of the square distances of an inverse Fourier transform of log-power density spectrum (cepstrum) of the time frames compared.

3. A process as claimed in claim 2 which further comprises, for the reproduction of encoded, stored speech signals, buffering the STP code word, and replacing the buffered STP code word by an STP code word present in the digital overall code word as a function of the STP parameter repetition contained in the digital overall code word.

4. A process as claimed in claim 1 which further comprises, for the reproduction of encoded, stored speech signals, storing the STP code word, and maintaining the stored STP code word or replacing the stored STP code word by and STP code word present in the digital overall code word as a function of the STP parameter repetition symbol contained in the digital overall code word.

5. A process as claimed in claim 1 which further comprises: recognizing a pause in the speech signal and in response forming a digital overall code word which includes information describing the energy of noise in the pause, the STP parameters describing the spectral properties of the noise, and the time duration of the pause.

6. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accommodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, which process further comprises: forming an LTP suppression symbol in the digital overall code word which symbol indicates whether the digital overall code word contains an LTP code word or not, the LTP suppression symbol being formed by comparing signals produced before and after an LTP analysis.

7. A process as claimed in claim 6 wherein said signal comparing comprises comparing a ratio of the signal energies after and before the LTP analysis with a presettable threshold value.

8. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accomodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, said process further comprising, forming as a part of the overall code word a symbol (unvoiced symbol) which indicates whether the overall code word comprises other code words besides the first (STP) code word, said symbol being formed as a function of a voiced/unvoiced decision.

9. A device for the recording and reproduction of a speech signal comprising:
short term prediction means for analyzing the speech signal in a first time frame so as to form a first code word that codes a spectral envelope of the speech signal in said first time frame,
long term prediction means for forming a second code word which codes a periodicity of the speech signal in said first time frame and for forming a residual signal representing a residue of the speech signal,
regular pulse excitation coding means for forming a third code word which codes the residual signal in said first time frame,
overall code word forming means coupled to the short term prediction means, the long term prediction means and the regular pulse excitation coding means thereby to form an overall code word for the first time frame, which overall code word comprises the first, second and third code words,
detection means fed by at least one of said short term prediction means, said long term prediction means and said regular pulse excitation coding means, the detection means detecting whether the speech signal in the first time frame meets a suppression condition and thereupon generating a suppression code,
means included in said code word forming means and fed by said detection means for, under control of said suppression code, suppressing any code word signal meeting the suppression condition from the overall code word, any overall code word containing at least a distinctive part of said suppression code,
storage means coupled to said overall code word forming means for storing the overall code word, and
speech synthesizing means for reading the overall code word from said storage means and for, in a second time frame, regenerating the speech signal from the overall code word.

10. A device according to claim 9 further comprising:
comparison means for making a comparison between a first sequence of sample values of the speech signal taken from the first time frame and a second sequence of sample values of the speech signal taken from a third time frame, the third time frame preceding the first time frame in time, the comparison means feeding
repetition symbol forming means for forming a repetition symbol indicating whether the comparison indicates that the first sequence and the second sequence meet a predetermined similarity criterion, the repetition symbol forming means feeding
the overall code word forming means for including the repetition symbol in the overall code word, and including the first code word in the overall code word only if the repetition symbol indicates that the similarity criterion is not met.

11. A device according to claim 10, wherein the comparison means comprise cepstrum distance determining means for determining a sum of squares of differences between first inverse fourier transform values of a first logarithm of a first absolute value of a first fourier transform of the first sequence and second inverse fourier transform values of a second logarithm of a second absolute value of a second fourier transform of the second sequence, the predetermined similarity criterion being that the sum of squares exceeds a predetermined threshold.

12. A device according to claim 10 wherein the speech synthesizing means comprise:
code word retrieval means fed by said storage means for retrieving the first code word and the repetition symbol from the overall code word, the code word retrieval means feeding
first code word buffering means for buffering the first code word, wherein the first code word buffering means update the first code word only if the repetition symbol indicates that the similarity criterion is not met.

13. A device according to claim 9 further comprising:
residue detection means for detecting whether the residue of the speech signal not accounted for by long term prediction meet a predetermined residue criterion, the residue detection means producing a long term suppression symbol indicating whether the residue criterion is met, the residue detection means feeding
the overall code word forming means for including the long term suppression symbol in the overall code word and for including the second code word in the overall code word only if the long term suppression symbol indicates that the residue criterion is not met.

14. A device according to claim 13, wherein the predetermined residue criterion is that a ratio between a first energy of an input signal of the long term prediction means and a second energy of the residue signal exceeds a predetermined threshold.

15. A device according to claim 13 wherein the speech synthesizing means comprise:
code word retrieval means fed by said storage means for retrieving the second code word and the long term suppression symbol from the overall code word, the code word retrieval means feeding
long term prediction synthesis means for synthesizing a regenerated long term predicted signal, the regenerated long term predicted signal being suppressed when the long term suppression symbol indicates that the residue criterion is met.

16. A device according to claim 9 further comprising:
voiced/unvoiced detection means for forming a voiced/unvoiced symbol which indicates whether the speech signal in the first time frame is voiced or unvoiced, the voiced/unvoiced detection means feeding
the overall code word forming means for including the voiced/unvoiced symbol in the overall code word and for allowing the second and third code word to be included in the overall code word only if the voiced/unvoiced symbol indicates that the speech signal is voiced.

17. A device according to claim 16 wherein the speech synthesizing means comprise:
code word retrieval means for retrieving the voiced/unvoiced symbol and the first code word, the code word retrieval means feeding
unvoiced synthesis means, the unvoiced synthesis means being activated when the voiced/unvoiced symbol indicates that the speech signal in the first time frame is unvoiced, the unvoiced synthesis means comprising a noise generator for generating a noise signal having a spectral envelope coded for by the first code word.

18. A device according to claim 9, further comprising:
a pause detector for detecting a pause in the speech signal and for forming a length code word
and an energy content code word estimating respectively a length and a noise energy content of the pause, the pause detector feeding
the overall code word forming means which derives a pause symbol indicating whether a pause is detected in the overall code word and, upon recognition of the pause, including the first code word, the length code word and the energy content code word in the overall code word.

19. A device according to claim 18 wherein the speech synthesizing means comprise:
code word retrieval means fed from said storage means for retrieving the pause symbol, the first code word, the length code word and the energy content code word, the code word retrieval means feeding
pause synthesis means for, when the pause symbol indicates a pause has occurred, forming, during a period of time determined from said length code word, a regenerated speech signal exclusively under control of the energy content code word and the first code word.

20. A device according to claim 9 which includes means for generating under predetermined conditions binary symbols forming the suppression code and which is a part of the overall code word and indicates the exclusion from said overall code word of at least one of said first, second and third code words.

21. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accommodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, said process further comprising: forming an LTP suppression symbol as a part of the digital overall code word, said LTP suppression symbol indicating whether or not the digital overall code word contains an LTP code word, and in the reproduction of speech signals stored as digital overall code words, the performance of an LTP synthesis being determined by said LTP suppression symbol.

22. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accommodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, said process further comprising: forming as a pary of the digital overall code word a symbol (unvoiced symbol) which indicates whether the overall code word comprises other code words besides the first (STP) code word, wherein for the reproduction of speech signals, stored as digital overall code words, the process further comprises; bridging a device for synthesizing speech signals from the periodicity as a function of said unvoiced symbol in the digital overall code word so that the residual signal is reduced to a generated noise signal.

23. A process for the digital recording and reproduction in a single device of speech signals characterized by a spectral envelope and a periodicity, comprising: for the recording, combining digitized speech sampling values of the speech signal in a respective time frame, for each time frame, forming a digital overall code word which accommodates a first code word for the spectral envelope (Short Term Prediction, STP, code word), a second code word for the periodicity (Long Term Prediction, LTP, code word), and a third code word for a residual signal (Regular Pulse Excitation, RPE, code word), storing said digital overall code word in a memory, and reproducing the speech signals from the stored digital overall code word, which process further comprises: recognizing a pause in the speech signal and in response forming a digital overall code word which includes a pause symbol, a time code word (T), a residual noise code word (N1) and a residual STP code word, and wherein for the reproduction of stored digital speech signals, a timer is reset in response to the pause signal in the digital overall code word, and via the time code word (T), and during a period of time thus defined forming the speech signal exclusively from the residual noise code word (N1) and the residual STP code word of the digital overall code word.

24. A device for the recording and reproduction of a speech signal comprising:
  short term prediction means for analyzing the speech signal in a first time frame so as to form a first code word that codes a spectral envelope of the speech signal in said first time frame,
  long term prediction means for forming a second code word which codes a periodicity of the speech signal in said first time frame and forming a residual signal representing a residue of the speech signal,
  regular pulse excitation coding means for forming a third code word which codes the residual signal in said first time frame,
  overall code word forming means coupled to the short term prediction means, the long term prediction means and the regular pulse excitation coding means thereby to form an overall code word for the first time frame, which overall code word comprises the first, second and third code words,
  means responsive to a signal supplied by at least one of said short term prediction means, said long term prediction means and said regular pulse excitation coding means for detecting whether the speech signal in the first time frame meets a suppression condition and if met generating a suppression symbol, and
  said code word forming means being controlled by said suppression symbol to suppress from the overall code word formed any code word meeting said suppression condition thereby to reduce the length of the overall code word.

25. A device for the recording and reproduction of a speech signal comprising:
  short term prediction means for analyzing the speech signal in a first time frame so as to form a first code word that codes a spectral envelope of the speech signal in said first time frame,
  long term prediction means for forming a second code word which codes a periodicity of the speech signal in said first time frame and for forming a residual signal representing a residue of the speech signal,
  regular pulse excitation coding means for forming a third code word which codes the residual signal in said first time frame,
  overall code word forming means coupled to the short term prediction means, the long term prediction means and the regular pulse excitation coding means thereby to form an overall code word for the first time frame, which overall code word comprises the first, second and third code words, and
  means responsive to signals supplied by said short term prediction means, said long term prediction means and said regular pulse excitation coding means for generating, as a part of the overall code word, suppression symbols indicating which, if any, of the first, second and third code words will be suppressed from the overall code word.

26. A device as claimed in claim 25 wherein said suppression symbols generating means comprises:
  means for comparing a first sequence of sample values of the speech signal in the first time frame and a second sequence of sample values of the speech signal in a third time frame preceding the first time frame in time, whereby as a result of the comparison, an STP suppression symbol is formed by the suppression symbols generating means indicating the presence or absence of the first code word in the overall code word.

27. A device according to claim 26 wherein the speech synthesizing means comprise:
  code word retrieval means fed by said storage means for retrieving the first code word and the STP symbol from the overall code word,
  first code word storage means coupled to said code word retrieval means for buffering the first code word, wherein the first code word storage means update the first code word as a function of the STP suppression symbol in the overall code word.

28. A device as claimed in claim 26 wherein said suppression symbols generating means further comprises:
  second means for comparing signals indicative of the first and second code words thereby to drive an LTP suppression symbol as a part of said overall code word, said LTP suppression symbol indicating the presence or absence of the second code word in the overall code word.

29. A device as claimed in claim 28 wherein the speech synthesizing means is responsive to STP and LTP suppression symbols indicating the absence of the first and second code words, respectively, from the overall code word thereby to omit a speech synthesis thereof.

30. A device as claimed in claim 28 wherein said suppression symbols generating means further comprises:
  means responsive to an output of the first comparing means for generating a voiced/unvoiced symbol in the overall code word, said voiced/unvoiced symbol indicating whether the speech signal in the first time frame is voiced or unvoiced, and wherein
  the speech synthesizing means includes means responsive to the voice/unvoiced symbol in the overall code word for generating a noise signal if said voiced/unvoiced symbol indicates that the speech signal in the first time frame is unvoiced.

31. A device as claimed in claim 28 further comprising:
  means responsive to the speech signal and to an output of the first comparing means for detecting a pause in the speech signal and for deriving a time duration code word (T) and an energy content code word (N1) indicating the time duration and energy content, respectively, of the pause, and wherein
  the overall code word forming means is controlled by the pause detecting means to derive a pause symbol in the overall code word whereby, if a pause is detected, the overall code word comprises the first code word, the time duration code word and the energy content code word, but omits the second and third code words.

* * * * *

UNITED STATES PATENT AND TRADEMARK OFFICE
CERTIFICATE OF CORRECTION

PATENT NO. : 5,251,261
DATED : October 5, 1993
INVENTOR(S) : Peter Meyer et al

It is certified that error appears in the above-indentified patent and that said Letters Patent is hereby corrected as shown below:

```
Column 10, line 52, after "repetition" insert --symbol--.
Column 10, line 58, "and" should read --an--.
Column 14, line 44, "pary" should read --part--.
Column 16, line 28, "drive" should read --derive--.
Column 16, line 48, "voice" should read --voiced--.
```

Signed and Sealed this

Thirtieth Day of May, 1995

Attest:

BRUCE LEHMAN

*Attesting Officer*   *Commissioner of Patents and Trademarks*